(12) United States Patent
Weiss et al.

(10) Patent No.: US 12,200,404 B2
(45) Date of Patent: Jan. 14, 2025

(54) EXPERIENTIAL VIRTUAL REALITY EVENT HOST DELIVERY DAIS

(71) Applicant: A1A Software LLC, Fernandina Beach, FL (US)

(72) Inventors: Tawnia K. Weiss, Fernandina Beach, FL (US); Charles B. Weiss, Fernandina Beach, FL (US); Patrick Witte, Fleming Island, FL (US)

(*) Notice: Subject to any disclaimer, the term of this patent is extended or adjusted under 35 U.S.C. 154(b) by 89 days.

(21) Appl. No.: 18/044,601

(22) PCT Filed: Mar. 31, 2022

(86) PCT No.: PCT/US2022/071463
§ 371 (c)(1),
(2) Date: Mar. 9, 2023

(87) PCT Pub. No.: WO2022/213104
PCT Pub. Date: Oct. 6, 2022

(65) Prior Publication Data
US 2024/0031532 A1    Jan. 25, 2024

Related U.S. Application Data

(60) Provisional application No. 63/169,303, filed on Apr. 1, 2021.

(51) Int. Cl.
*H04N 7/15* (2006.01)
*H04N 7/14* (2006.01)

(52) U.S. Cl.
CPC .............. *H04N 7/157* (2013.01); *H04N 7/14* (2013.01); *H04N 7/142* (2013.01); *H04N 7/15* (2013.01); *H04N 7/152* (2013.01)

(58) Field of Classification Search
None
See application file for complete search history.

(56) References Cited

U.S. PATENT DOCUMENTS

| 9,244,533 B2 | 1/2016 | Friend et al. |
| 9,274,595 B2 | 3/2016 | Reitan |

(Continued)

FOREIGN PATENT DOCUMENTS

| JP | 58059456 A | 4/1983 |
| KR | 1020150126938 A | 11/2015 |
| WO | 2013032955 A1 | 3/2013 |

*Primary Examiner* — Quoc D Tran
(74) *Attorney, Agent, or Firm* — Lori Sandman, Esq.

(57) ABSTRACT

This patent pertains to the field of event hosting. More specifically, it provides a virtual reality dais, or interactive experiential environment for event hosts to create interactions in real time between people, businesses, and event personnel. The invention allows an individual, personified in an avatar, to have real-time physical encounters and experiences from remote locations and independently travel through an event. Participants in a conference, tradeshow or music, sporting, competitive gaining or other events can become directly engaged in speaking sessions, educational forums, meetings and social settings even if they cannot be there physically. The present invention discloses methodology that will allow a host to build, implement, modify and execute a virtual reality event with functionality consistent with traditional tradeshow, convention, educational or other presentation forums so that hosting is simple, convenient and practical.

16 Claims, 6 Drawing Sheets

(56) References Cited

U.S. PATENT DOCUMENTS

| | | | |
|---|---|---|---|
| 10,002,337 B2 | 6/2018 | Siddique et al. | |
| 10,043,316 B2 * | 8/2018 | Donnelly | G05D 1/0246 |
| 10,403,050 B1 | 9/2019 | Beall et al. | |
| 10,701,426 B1 | 6/2020 | Van Hoff et al. | |
| 10,821,347 B2 * | 11/2020 | Reilly | G09B 19/0038 |
| 10,908,769 B2 * | 2/2021 | Agarawala | G06F 3/04817 |
| 2003/0156135 A1 | 8/2003 | Lucarelli | |
| 2008/0263458 A1 | 10/2008 | Altberg et al. | |
| 2009/0183071 A1 * | 7/2009 | Smith | G06F 3/01 715/706 |
| 2012/0238358 A1 * | 9/2012 | Hoffman | H04L 67/01 463/29 |
| 2013/0024272 A1 | 1/2013 | Pradeep et al. | |
| 2013/0117704 A1 * | 5/2013 | Lahoutifard | A63F 13/335 715/780 |
| 2013/0215116 A1 | 8/2013 | Siddique et al. | |
| 2013/0219357 A1 | 8/2013 | Reitan | |
| 2013/0222371 A1 | 8/2013 | Reitan | |
| 2013/0226758 A1 | 8/2013 | Reitan | |
| 2013/0232430 A1 | 9/2013 | Reitan | |
| 2013/0238778 A1 | 9/2013 | Reitan | |
| 2013/0249947 A1 | 9/2013 | Reitan | |
| 2013/0249948 A1 | 9/2013 | Reitan | |
| 2014/0063061 A1 | 3/2014 | Reitan | |
| 2015/0235433 A1 | 8/2015 | Miller et al. | |
| 2016/0210602 A1 | 7/2016 | Siddique et al. | |
| 2017/0365102 A1 | 12/2017 | Huston et al. | |
| 2018/0025415 A1 * | 1/2018 | Engel | G06F 3/04815 705/14.56 |
| 2018/0342106 A1 | 11/2018 | Rosado | |
| 2019/0362312 A1 * | 11/2019 | Platt | H04L 65/1069 |

* cited by examiner

EXPERIENTIAL VIRTUAL REALITY EVENT HOST DELIVERY DAIS

CROSS-REFERENCE TO RELATED APPLICATIONS

This application claims the benefit of the prior filing date under 35 U.S.C. § 119(e) of U.S. Provisional Application No. 63/169,303, filed on Apr. 1, 2021.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND

This patent pertains to the field of event hosting. More specifically, it provides a virtual reality environment for interactions in real time between people, businesses, and event hosts. The invention allows an event host to create a virtual space where individuals, personified in avatars, have real-time physical encounters and experiences from remote locations and independently travel through an event. The event host creates an environment where participants in a business meeting, conference, tradeshow or music, sporting, competitive gaming or other events can become directly engaged in speaking sessions, educational forums, interactive meetings and social settings even if they cannot be there physically. It provides a novel platform for a virtual event that can be customized, edited or expanded in real time by the host: a host-delivery dais, or HDD.

Domestic, international and multinational companies interested in promoting their business use conventions or trade show venues to meet with customers, vendors, manufacturers and distributors. Increasingly, revealing and launching new products happens at these types of events so that targeted audiences can see and understand innovation in a particular industry. Booths and exhibits feature products and services; they have become more complex, incorporating art, design and lighting technology to capture interest. While this is currently the standard across many industries for product and service launch, the global pandemic has changed the way people, businesses and their customers interact. Business and social restrictions around the globe have forced audio and video communications to evolve rapidly. Today, new platforms and methods of meeting to share information, transfer technology and participate collaboratively are needed, especially while many are now working from a distance or from home.

Innovation in virtual reality and gaming have resulted in a heighted expectation of real world and real time participation. Individuals are increasingly comfortable with electronic interactions to do business and socialize. Social media platforms and video conferencing have paved the way for consumers to expect interactive experiences and businesses to adopt new practices for implementing those experiences. The present invention discloses methodology that will allow a host to build, implement and execute a virtual reality event with functionality consistent with traditional tradeshow, convention, educational or other presentation forums so that hosting is simple, convenient and practical.

SUMMARY

The present invention offers a tool for event hosts to create a venue for individuals and businesses to connect and to have that event despite weather, health, public safety or distance challenges. Through the HDD, the host can provide rapid registration, allow and restrict access to sessions within the event, coordinate sponsors and advertisers and execute tasks they would typically deal with in person. It uses new and presently evolving technology to improve existing systems for virtual conferencing, while adding a gaming component to make the experience enjoyable on multiple levels.

In one embodiment, the HDD is deployed as a fully real-time social application, or app. The system may also be accessed through a web browser. The present app is distinct from other social and conference apps in that the interactions of each attendee, whether a vender, guest, show participant or attendee (hereinafter "attendee" or "attendees") are portrayed to all other attendees inside the same room, as well as to the host. This includes but is not limited to body movement, gestures, voice chat, and text chat. Subject to access provided by the host, attendees are not limited to areas or sections of a room; instead they can walk freely and realistically interact in real time and space. Attendees can utilize furniture and chairs and they can interact with many objects such as pamphlet racks and televisions or other audio or video components present in the room. Attendees can move their avatars to specially designated "interactive plus" areas of the room; one example of an interactive plus area is a dance floor which will give independent and individual characters more options for dancing moves or the ability to dance freely when gesture controls are available.

The invention disclosed is capable of connection with VR, or virtual reality components such as headsets or other wearable technology. As an example, if the user is wearing a VR headset, then the app also projects head movements and body direction reflecting the actions of the user. If the user is wearing a virtual headset with interactive controllers or hand gesture detection, the movement of hands and fingers of the user are also visible to all other users in a room.

Another feature of the present invention can be described in terms of rooms. Rooms are the part of the HDD that can reflect any indoor or outdoor space and are fully customizable by the host. Stock greeting rooms, meeting rooms, private rooms, expo halls, and conference rooms are available to anyone who uses the app. The host can also request that a custom designed room be created by an art team, and uploaded to the server for use by the host within the host's HDD. The following are a sample of various types of room that can be deployed within the HDD; this list is for exemplary purposes only and is not meant to limit the scope of the possible spaces that might be created and used by a host:

Greeting Rooms:
    These rooms are used as a starting point for most typical uses of the app. Users can choose to socialize, review billboards and posters, check meeting room times, or move into in any other available room.

Private Rooms:
    Private rooms can be created at any time while the user's avatar is active inside the app. These password-protected rooms allow groups of users to have an isolated area to speak freely without any unwanted eavesdropping.

Meeting Rooms:
  Meeting rooms create an office style meeting structure. Hosts can create a meeting room to seat any number of users. Meeting rooms can be used as an open forum for talking, watching videos, or viewing presentations. Hosts of the meeting can mute and unmute participants.

Expo Halls:
  Expo halls are used for vendors to meet and interact with users of the software. The hall can be filled by the host with booths, pamphlets, lounge seating areas, sponsor banners, videos or any kind, private speaking areas, and many more features.

Conference Rooms:
  Conference rooms are auditorium style rooms. Presenters can interact with the host to schedule what time and day during the conference a presentation will be held. Presenters can approach a podium for talking to the audience. They can also deliver presentations such as power point presentations or videos. Presenters can click on the hands of users to enable them to speak globally to the room so all users in the room as well as other audiences selected by the host can hear them.

Chat Rooms:
  Chat rooms allow you to talk with anyone in the room. A general chat window is automatically loaded in every room. Alternate chatrooms can be created and joined by anyone who uses the same chatroom names.

The app-based HDD is capable of use on a wide range of platforms, including but not limited to android phones and tablets, IOS phones, tablets and other devices, Windows and Mac personal computers (PC's), and virtual reality devices and systems such as but not limited to Oculus, Google Cardboard and similar VR tools.

It is an object of the present invention to provide an alternative platform for group gatherings, instead of or in addition to live events or in-person meetings.

It is another object of the invention to provide a host delivery dais, or HDD, for event hosts and venue operators to establish a virtual location and simulate real time events.

It is a different object of this invention to provide a virtual reality venue through which event organizers can engage with and connect vendors and meeting or conference attendees in real time, from a distance.

It is also an object of this invention to provide a method for employers to connect and engage with employees who are separated by distance.

REFERENCE CHARACTERS USED IN THE DRAWINGS

1. Host delivery dais (HDD)
3. Application host delivery dais interface (AHDDI)
5. Host delivery dais website interface (HDDWI)
10. Application HDD Server (AHDD)
15. Asset server
17. Live video server
20. Application programming interface (API)
25. graphics engine
26. physics engine
27. Communication network server
30. Digital walls
35. venue configuration profile
40. attendee configuration profile
45. Virtual Venue Data File

DETAILED DESCRIPTION

Figure 1:
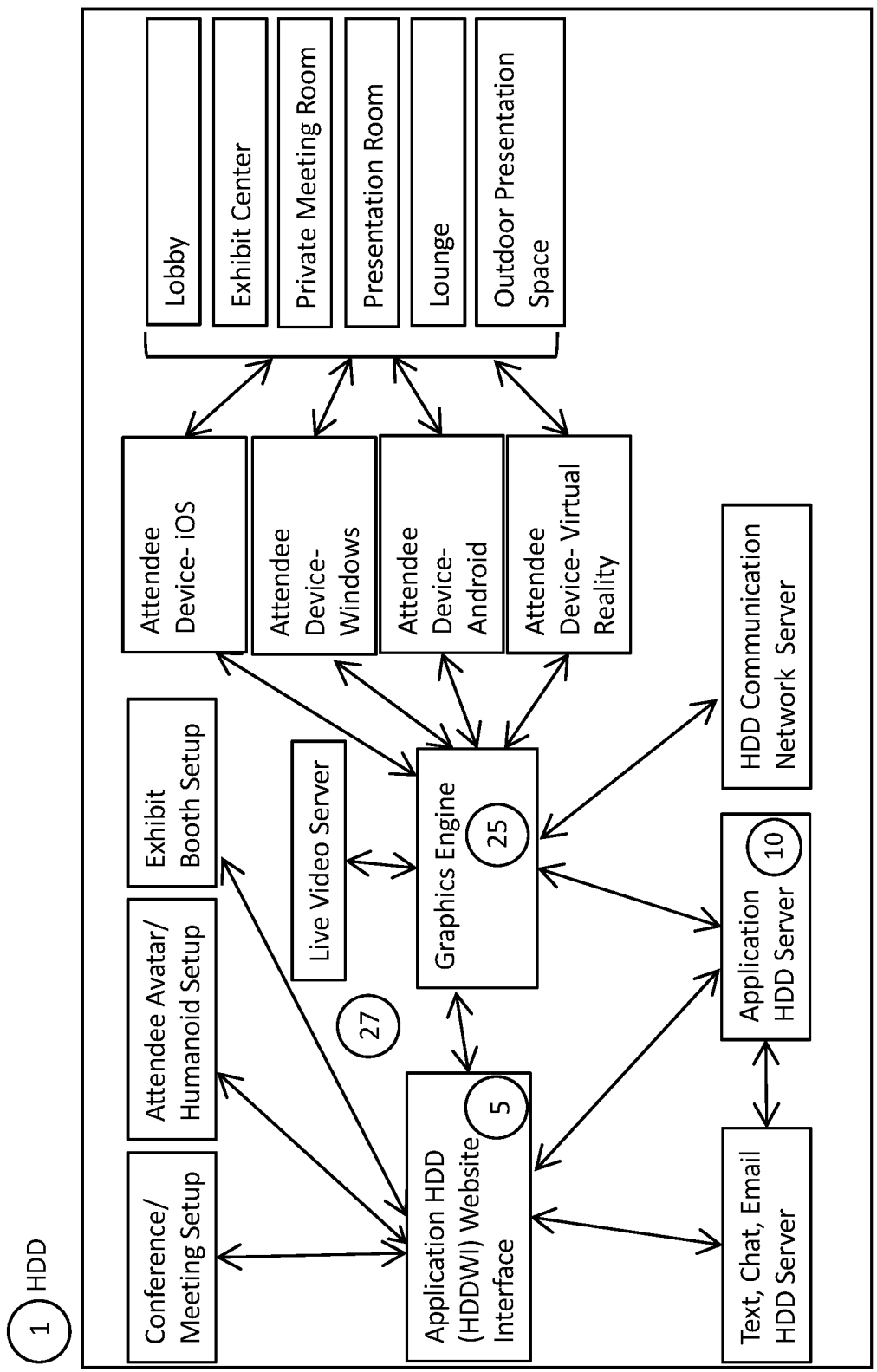
FIG. 1 illustrates a virtual reality host delivery dais (HDD) application schema outlining the invention.

While the invention is described in conjunction with the accompanying drawings, the drawings are provided to illustrate certain embodiments of the invention and are not to be construed as limiting the invention to such embodiments. It is understood that the invention may comprise variations to form in various components and arrangement of components and in various steps and arrangement of steps beyond those provided in the drawing and the associated description.

FIG. 1 illustrates a virtual reality application schema outlining a preferred embodiment of the HDD 1. An attendee, whether an event participant or vendor, uses the invention by accessing the Application HDD Website Interface (HDDWI) 5 from a website or application (app). The HDDWI 5 is hosted on one or more secure cloud servers, the Application HDD Server 10 or AHDD 10.

Virtual setup of an event is initiated when an organizer or host enters the HDDWI 5 and is authenticated and allowed set up access and features. The host configures the event environment, including establishing the number of rooms, their configuration and arrangement in the virtual space; establishes desired limits or expands sets of humanoid/avatar characteristics, actions and interactions; provides vendor permissions and access; and sets up timing and schedules in the venue configuration profile 35 and the attendee configuration profile 40 and provides the host-selected credentialing and assets in the virtual venue data file 45, where attendees accesses this data. Avatars are capable of having humanoid or human-like characteristics that are individually selected by the attendees from the data in the virtual venue data file 45.

Once the host has configured the environment, vendors are invited to become authenticated and enter the event, where they can load all materials desired into their booths or virtual spaces. When the environment and vendor spaces are set up and features are enabled, other attendees and participants can setup and configure an individual humanoid persona or avatar. The HDDWI 5 communicates with a third party application programming interface (API) 20 to establish text, chat, and email capability within the environment; the API 20 also connects to and communicates with cloud servers to enable resources and provide additional functionality from the cloud. The HDDWI 5 and connected cloud servers communicate with the application and its 3D graphic engine. Communication is established between the graphic engine and a communication network server 27 (also using a third party supplier), which allows communication between the individual users through their avatars, including text, chat an email. The application engine also can link with a live video server 17 for capturing audio and video service, such as YouTube, Multiview or any service that provides a website address to access live feed. This allows for linking an attendee with live audio and video content. The service communicates directly with the application and its graphics engine 25. From the application and through its connected graphics engine 25, a plurality of controls are established that the attendee uses to view the environment, including but not limited to a lobby, exhibit center, private meeting room, presentation room, lounge and outdoor presentation space. In a different embodiment, the environment includes recreational areas such as a bar, restaurant, outside decks, sports areas, and the like. The application engine is further capable of spatial awareness and 3D surround sound, such that only those avatars nearby can listen to a particular conversation.

In one embodiment, the virtual reality platform is capable of accommodating up to 150 users per room; it includes a gathering place for socializing where users can mingle upon logging in; meeting rooms for discussing or listening; and outdoor settings. Corporate meeting planners can choose a single large ballroom or multiple smaller rooms for more intimate conversation. Attendees can access the event through IOS, Windows, Android, VR or AR devices. Once guests enter the event, they individually and independently navigate through the various spaces in the HDD 1, which include as exemplary but are not limited to the lobby, exhibit centers, private meeting rooms, presentation rooms, lounges and outdoor spaces. In one example of a meeting activity, a video screen enables streaming of a live or pre-recorded message as attendees move into and out of the viewing area. The avatar may be displayed as a humanoid, with human characteristics that the attendee selects including visual data corresponding to the display of the humanoid, having gestures, movement, gender, skin color, outfit selection, logos or combinations thereof.

Figure 2:
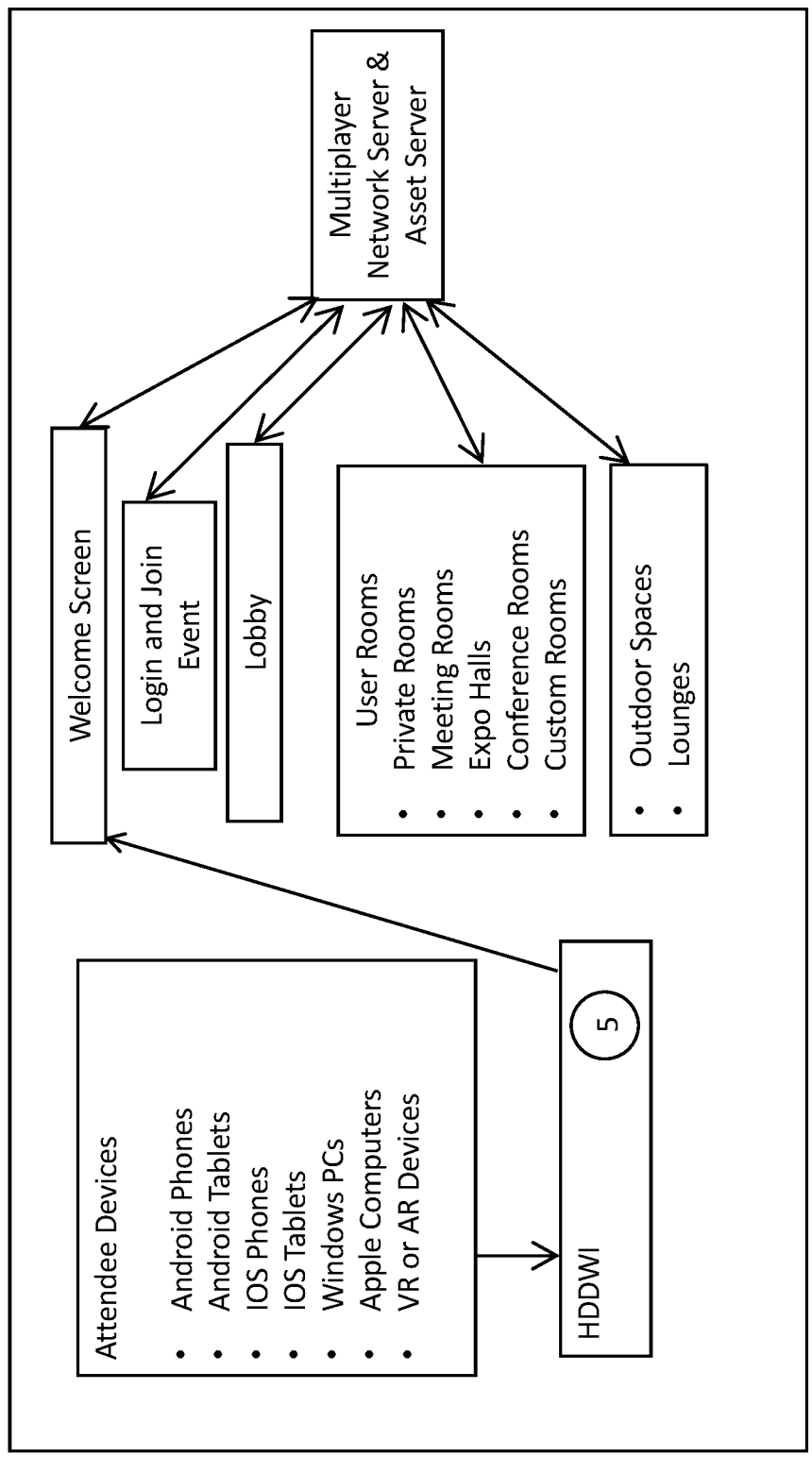
FIG. 2 is a flow diagram illustrating user interaction with the HDD.

In FIG. 2, a flow diagram illustrating attendee interaction with the HDD 1 is provided. The attendee accesses a real-time development platform via an application or browser-based program located on android or IOS phones or tablets, Windows or Apple computers or virtual reality (VR) devices. PC or Apple computing devices can be controlled by keyboard and mouse input to allow the attendee avatar to move freely. On mobile or tablet applications, touch screen input and virtual joysticks allow for the same level of control as on a personal computer.

From a "welcome" or home screen, the attendee can log in and join an event, either independently or as part of a multi-player network, through network and asset servers 15. Once logged in, the attendee is connected with the multi-player network server enters a lobby and can access a plurality of user rooms, including as exemplary but not limited to private rooms, meeting rooms, exposition halls, conference rooms and custom rooms created by the host for particular events and gatherings.

Interactions with the system by host and attendees include accessing a programming interface to establish text chat, voice chat, or email between the attendee avatar and another attendee avatar or the host. Further interaction by the host includes displaying art assets, displaying media, enforcing digital walls 30, enabling voice control or entering chat rooms.

The interaction by attendees further includes virtually meeting up with other attendees, speaking to other attendees, capturing vendor materials or attending talks, seminars or sessions in different rooms in real time.

Figure 3:
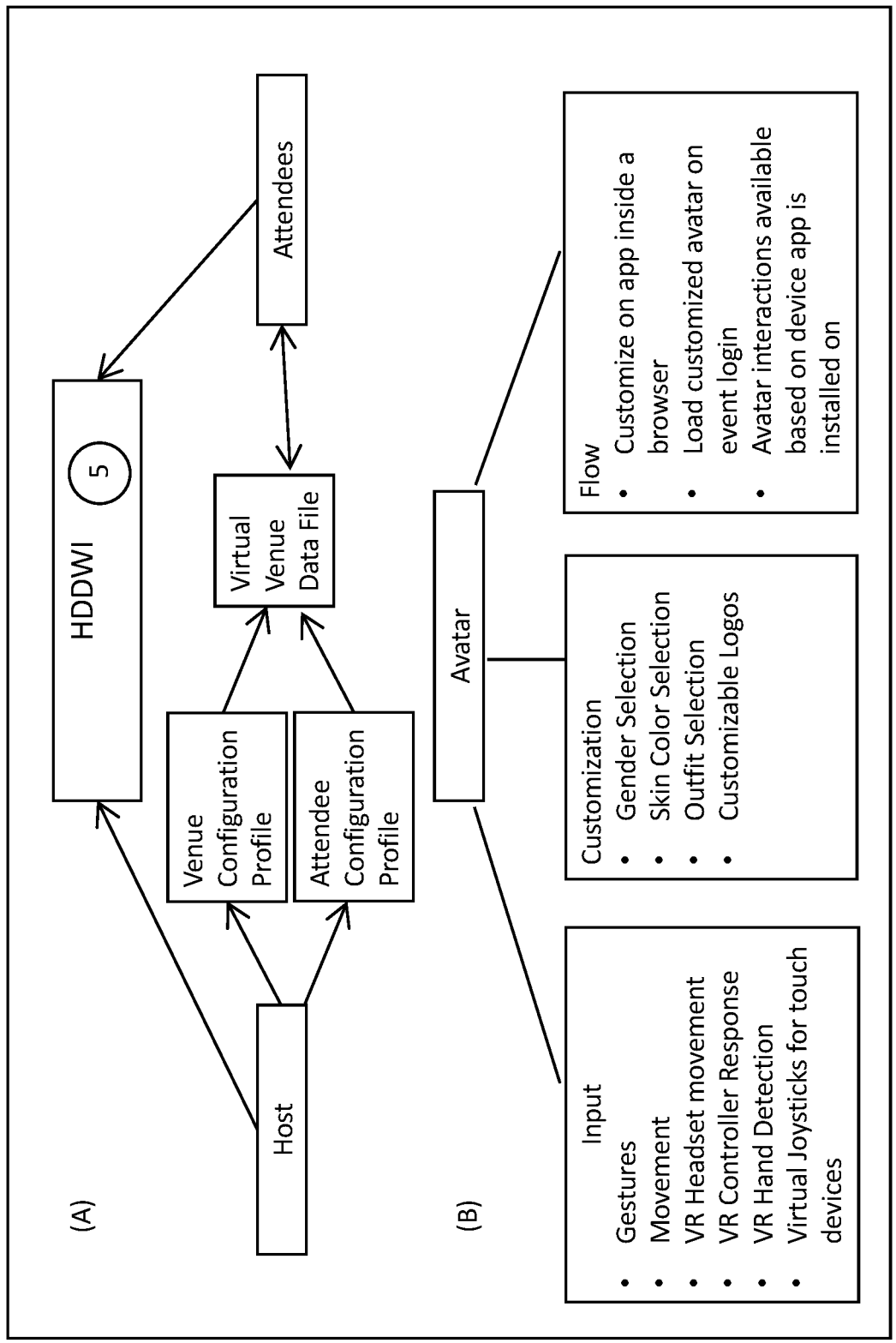
FIGS. 3A and 3B are flow diagrams showing an embodiment of an attendee avatar configuration and profile setup.

In FIGS. 3A and 3B, flow diagrams show the attendee avatar configuration and profile setup. In FIG. 3A, the method of establishing the functionality of the attendees is shown. An application host delivery dais interface (AHDDI) 3 is provided. The host accesses the AHDDI 3 from a host device to create a venue configuration profile 35 and an attendee configuration profile. The venue configuration profile 35 is created by the host on the HDD 1 and includes access and performance parameters for the conference and meeting environment and allows for exhibit and vendor access and content delivery. The attendee configuration profile includes access and performance parameters for humanoid/avatar configurations and provides participation credentials and attendee access to vender and content delivery and event materials. It may include authentication of vendors, exhibitors or presenters to allow vendor-specific setup controls. From these profiles, the host generates a virtual venue data file 45 that is accessible by the attendee. The virtual venue data file 45 includes selectable assets and a plurality of digital spaces defined by digital walls 30 and digital rooms navigable by one or more attendee avatars. The virtual venue data file 45 also includes an application engine that links a attendee with a live video service that provides a website address to access live feed. The attendees access the AHDDI 3 from an attendee device to engage with a virtual venue data file 45 created and assigned by the host. The attendee generates an avatar from a virtual venue data file 45 provided by the host. The avatar is then displayed in the HDD 1. Then, attendees can direct their custom-assembled avatar and direct it to move within the digital spaces defined by digital walls 30 or digital rooms of the virtual reality event host delivery dais. Each avatar can detect the proximity to objects or other attendee avatars and initiate an interaction in response to the proximity of the attendee avatar to objects or other attendee avatars.

FIG. 3B shows avatar customization and feature setup. The attendee provides input to establish a set of actions, including gestures, movement, VR headset movement and VR controller response, any hand detection of VR devices and virtual joysticks for touch devices. The attendee configuration profile 40 also includes customized exhibitor or presenter access to set up and stock virtual booths or virtual exhibition areas. The avatar itself may be customized by selecting gender, skin color, particular outfits or costumes, and customizable logos can be included. Customizable logo choices can allow for multiplayer networking and recognition as well as branding or promotion for individual participants. The avatar's movement through the events and event spaces can also be customized. The conference meeting environment comprises selectable physical environment components including a lobby, private or public meeting rooms, exposition halls, conference rooms, custom rooms, outdoor spaces, lounges or sporting areas; and attendees virtually and independently move within said conference meeting environment. The path or flow of the attendee's avatar can also be customized on the app inside of a browser. The customized avatar is loaded upon login to the event, and the avatar's interactions and flow can be tailored by the host to be accommodated by specific devices; in this way the avatar can be excluded from or allowed into various rooms, exhibits, programs, or events.

Figure 4:
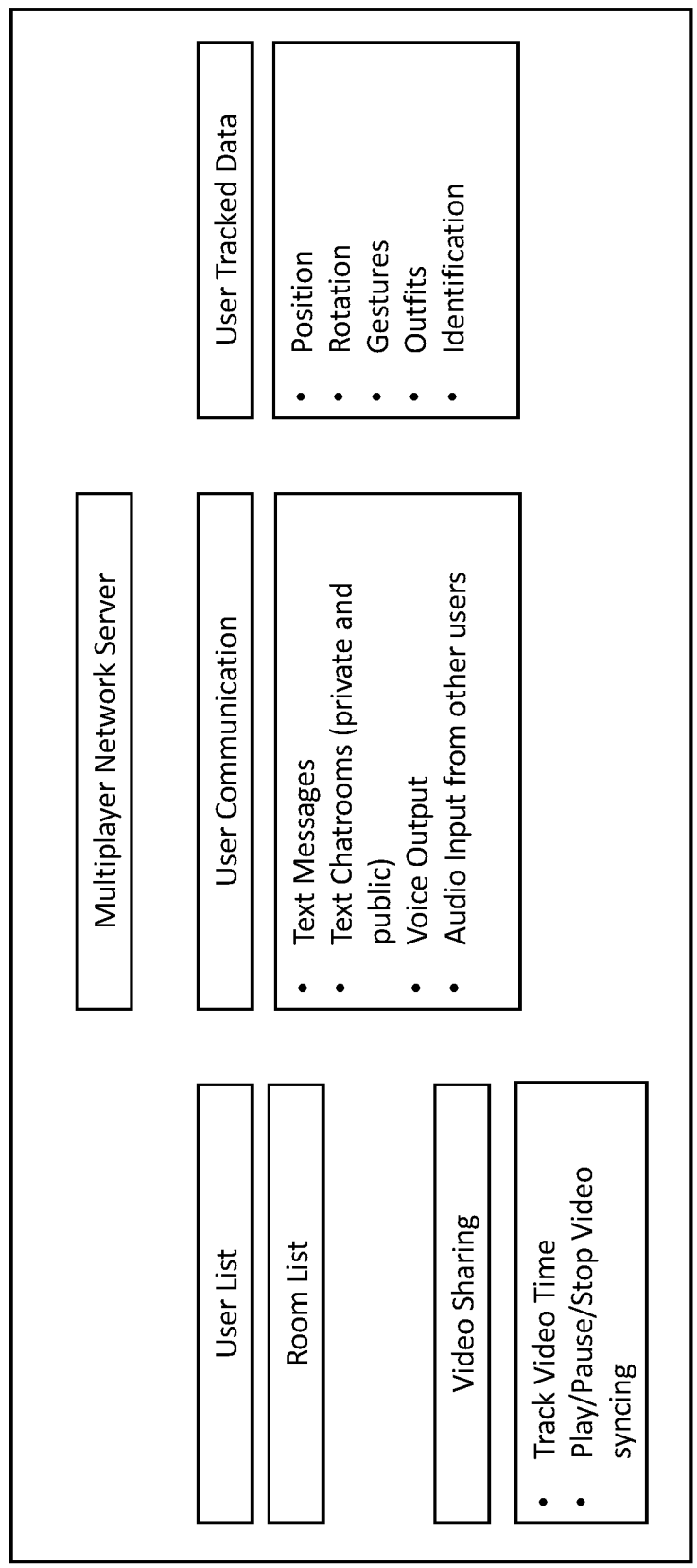
FIG. 4 is a chart showing aspects of a multiplayer network.

FIG. 4 illustrates a multiplayer network. A server contains program code located in a functional form on computer readable storage media, which can be loaded onto or is selectively removeable and may be transferred to a device which includes a data processing system for execution by a processor unit. Alternatively, program code can be transferred using computer readable signal media. In a preferred embodiment, program code may be downloaded over a network to persistent storage from another device or a data processing system which provides program code. The data processing system that provides the program code may be a server computer, a host or attendee computer, or some other device capable of storing and transmitting program code.

The multiplayer network server comprises at least an attendee list and a room list. It provides for video sharing, and allows attendees and hosts to track video time and control video syncing and provides for play, pause, and stop controls. The multiplayer network server also provides for communication between the attendees and host, and between attendees directly by text messages, private and public chatrooms, and audio communications via voice output and audio input.

The multiplayer network server also provides the ability to track and take advantage of artificial intelligence related to position, rotation, gestures, costuming or outfit and identification information that can be collected, stored and processed.

Figure 5:
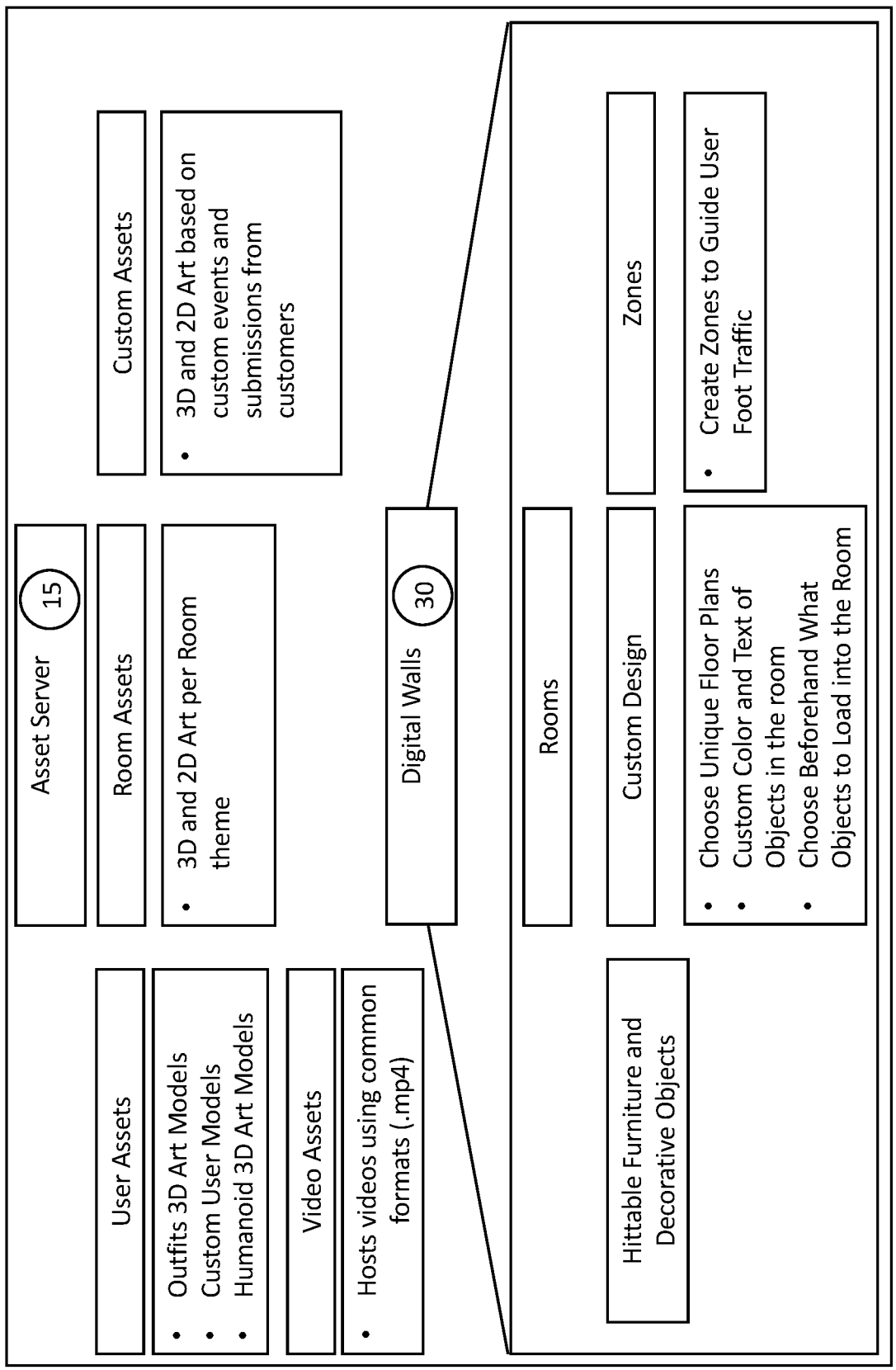
FIG. 5 is a chart showing the asset server and various aspects of asset setup.

In FIG. 5, the various assets and aspects of the asset server 15 are presented. Assets comprise the various customization features that can be deployed by the host for use by the attendees and the system. All assets are loaded onto a server. Assets may include art assets such as outfits, skin and hair color and other customizations for avatars; video assets for the host to capture and display features; room assets that allow customized room themes, art and décor; and custom assets that can be used to create multi-dimensional art for custom events and submissions made by attendees or vendors. At any point an asset can be changed or updated by the host. This allows the meetings or conferences to be responsive to changes in real time. If a change or fix is needed for a particular asset, this can be done on the website without interruption to an active event while still updating the experience for the active user.

Assets are loaded onto the asset server 15. At any point an asset or other settings can be changed or updated. This allows the meetings or conferences to be responsive to changes in real time. If a change or fix is needed for a particular asset, this can be done on the website without interruption to an active event while still updating the experience for the active user.

Art assets add color, tones, design and other artistic elements to be incorporated into both the avatar configuration profiles and the venue configuration profiles 35. Avatar skin, hair and costume or clothing colors can be individually selected. The host can create environments for specific events by changing the venue configuration profile 35, adding different colors, objects such as furniture and art, and event specific materials such as pamphlets and business or individual biographical information.

Assets in the form of "footprints" are used for engineering a room. These non-graphical art files are used to stage and decorate a room. Each room is generated dynamically at run time. One advantage over related art is that an artist is not required to build out a 3D model with all the details of a room. Instead, these footprints provide architect files directing location information relating to where every asset will be placed. Examples of footprint asset components include but are not limited to articles such as a chair, rug, picture, desk, starting location, door, pamphlets, videos, etc. When the host or attendee enters a room, the server accesses the files and downloads the required art models from the server and puts them at the location specified by the footprint.

Another type of asset that can be deployed for use on the HDD 1 is media. Most traditional media types can be used inside the app. ".mp4" movies and PDF files are examples of content a user can upload using our website interface and then the items will be loaded into the specified rooms when the materials are required.

A different asset type capable of use within the HDD 1 is digital walls 30. Digital walls 30 exist in the system in rooms that can accommodate a high volume of people. Hundreds of users walking freely may be acceptable in some events, but in open floor plans like exposition halls, these digital walls 30 are invisible to the eye but can be used to cut down on the number of people occupying a single "server" room. Server rooms are those created on the network hosting the system's app data and should not be confused with traditional app rooms listed above. Digital spaces defined by digital walls 30 may include lobby, outdoor, sporting, lounge, or interactive plus spaces; and wherein particular or enhanced activity selections are available to an attendee in each of the digital spaces defined by digital walls 30. Digital recreational areas may include a bar, a restaurant, an outside deck, a sports area, and combinations thereof.

Voice control is a different asset, where attendees can mute and unmute themselves freely. While unmuted, users nearby can hear them. The app uses spatial awareness and a 3D surround sound technique so that only those nearby can listen in on conversations. The reduces the clutter of sounds in rooms where a lot of users are present.

Chat rooms are a different type of venue asset that allow you to talk with anyone in the room. A general chat window is automatically loaded in every room. Alternate chatrooms can be created and joined by anyone who uses the same chatroom names.

Figure 6:
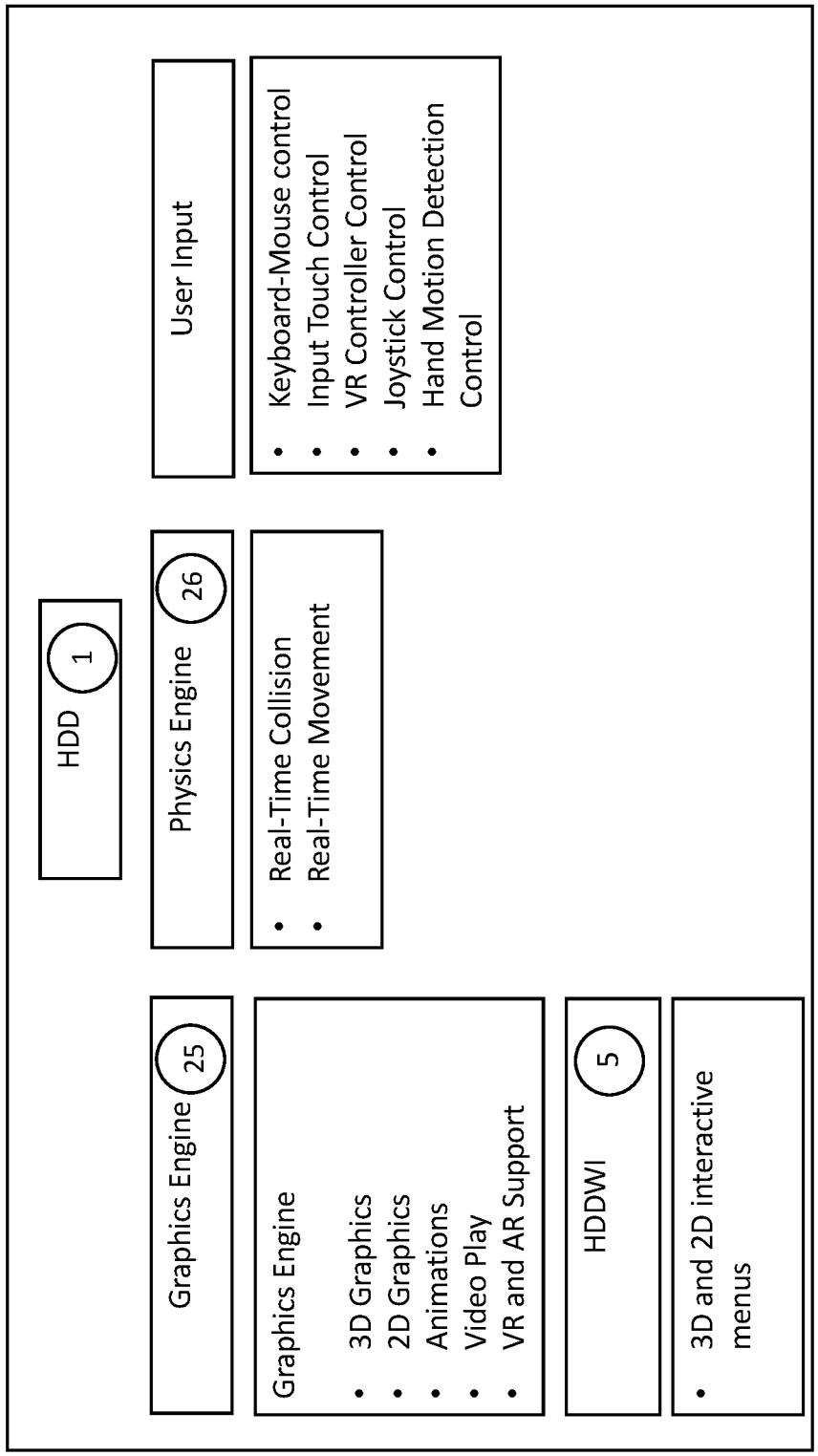
FIG. 6 shows a chart illustrating the real-time development platform of the system.

In FIG. 6, the real-time development platform is shown. A graphics engine 25 provides multi-dimensional of at least 2 dimensional (2D) and 3 dimensional (3D) graphics through the graphics engine 25 of the platform. The graphics, animations, video play and VR support are stored and accessed here. The host and attendees access these through the host or attendee interface, which includes at least 2D and 3D interactive menus. A physics engine 26 controls real-time movement and avatar interaction, including collision and conversation actions. The host and attendees interact with the system through standard input and control methodology and devices including but not limited to keyboard and mouse control, input touch control, VR controller and joystick control, and hand motion detection and control. The method for hosting a virtual reality venue for interactive events in real time as described herein includes, generally the following steps. These steps are not necessarily dependent upon their particular order as presented here, and fewer or additional steps may be incorporated and still remain within the contemplation of this disclosure. The method comprises providing an application host delivery dais, HDD 1, including a website interface, the HDDWI 5, which is cloud-based and accessed through an application of a computing device or from a website through a web browser. The HDD 1 further comprises a plurality of digital assets and rooms that are selectable by the host and navigable by one or more attendee avatars, as well as a number of design elements for individual avatar features that can be selected and applied. The host accesses assets from an asset server 15 of the HDD 1, including art assets for rooms and their functional features, footprints, media, digital walls 30, volume controls and rooms to create a virtual venue configuration profile 35. The host also creates an attendee configuration profile 40 to be used by the attendee to personalize his or her avatar.

The host enters and accesses the HDD 1 through the HDDWI 5 from a host device such as a phone, computer, tablet, or autonomous AR device, either through an application or website. The host is authenticated via a password, code or other individual authentication means, enabling host access to all setup controls. The host engages with these controls and sets up access and performance parameters to select and build one or more venue configuration profiles 35 and attendee configuration profiles 40 controlling at least the following: conference/meeting environment; humanoid/avatar configurations and appearance; and exhibit & vendor access and content delivery. Once the desired features, including access, avatar, vender and performance parameters have been selected, the host generates virtual venue configuration profiles 35 and virtual attendee configuration profiles 40. Once these profiles are generated, the host loads and provides attendees access to the allowed configurations of the venue configuration profiles 35 and the attendee configuration profiles through the virtual venue data file. Attendees access the HDDWI 5 from a user device through a website or application. Attendees then have access to the virtual venue data file 45 to configure personal and individual settings to generate an avatar from the attendee configuration profile 40 assigned by the host.

Once configured by the attendee, an avatar can enter the virtual reality event. The attendee directs its personally configured avatar to move within at least one of a plurality of digital rooms of the virtual reality event host delivery dais, where it detects proximity to objects or other user avatars. Authenticated vendors, exhibitors or presenters set up and stock booths or exhibition areas; interactions are initiated in response to the proximity of the avatar to objects or other attendee avatars. Attendees or guests as avatars are provided access to virtual environment, and can then virtually travel through the environment, meet up with and speak to other users, capture vendor materials and attend various talks or sessions in different rooms in real time.

The invention comprises a system, including a processor, a memory configured to store instructions. The processor is in communication with the memory, and it is configured to execute instructions for at least the following actions:

accessing an application host delivery dais interface from a host device to create a venue configuration profile 35 and an attendee configuration file; generating a virtual venue data file 45 from the venue configuration profile 35 and the attendee configuration file, wherein the virtual venue data file 45 is available upon a virtual reality event host delivery dais, the virtual reality event host delivery dais comprising a plurality of digital rooms navigable by one or more attendee avatars; accessing the application host delivery dais interface from an attendee device to create an attendee configuration profile 40 and a venue configuration profile 35; creating a virtual venue data file 45 from the attendee configuration profile 40 and a venue configuration profile 35; generating an attendee avatar from a virtual venue data file 45 assigned by a attendee or a host; displaying the attendee avatar in the virtual reality event host delivery dais; directing the attendee avatar to move within the at least one of the plurality of digital rooms of the virtual reality event host delivery dais; detecting proximity of the attendee avatar to objects or other attendee avatars; and initiating an interaction in response to the proximity of the attendee avatar to objects or other attendee avatars.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A method for creating and hosting a virtual reality venue for interactive events in real time, the method comprising:
    (a.) providing a host delivery dais accessed through a host delivery dais website or application interface;
    (b.) a host accessing the application host delivery dais interface from a host device and creating at least:
        i. a venue configuration profile, wherein the venue configuration profile includes access and performance parameters for one or more of: a conference; professional meeting; tradeshow; music, sporting, or gaming events; and exhibit and vendor environments, for accessing and delivery of content; and
        ii. an attendee configuration profile, wherein the attendee configuration profile includes access and performance parameters for one or more of humanoid/avatar configurations, participation credentials, and attendee access to vendor content delivery and event materials, and wherein the humanoid/avatar configurations further include inputs, customization and movement flow data; and wherein said inputs are selectable from the group consisting of gestures, movement, alternate reality (AR) and virtual reality (VR) headset movement, controller response, hand detection, virtual joysticks and touch devices; customizations are selectable from the group consisting of gender, skin color, outfit or costume, and customizable logo choices; and movement flow data consists of selectable interactions with objects and movement between them;
    (c.) the host generating a virtual venue data file from the venue configuration profile and the attendee configuration profile and assigning virtual venue data to attendees;
    (d.) the host providing access to attendees to attend a scheduled session or event;
    (e.) attendees accessing the host delivery dais interface from an attendee device to engage with the virtual venue data file created and assigned by the host;
    (e). generating an avatar from a virtual venue data file wherein said avatar is capable of spatial awareness and 3D surround sound such that only those avatars nearby can listen to conversations;
    (f.) displaying the avatar in the virtual reality event host delivery dais;
    (g.) directing the avatar to move within the at least one of the plurality of digital spaces defined by digital walls or digital rooms of the virtual reality event host delivery dais;
    (h.) detecting proximity of the attendee avatar to objects or other attendee avatars; and
    (i.) initiating an interaction in response to the proximity of the attendee avatar to objects or other attendee avatars.

2. The method of claim 1, wherein the conference meeting environment further comprises selectable physical environment components including one or more of a lobby, private or public meeting rooms, exposition halls, conference rooms, custom rooms, outdoor spaces, lounges or sporting areas; and wherein attendees virtually and independently move within said conference meeting environment.

3. The method of claim 1, wherein the plurality of digital rooms includes one or more of greeting rooms, private rooms, meeting rooms, exposition halls, conference halls or chat rooms.

4. The method of claim 1 where the plurality of digital spaces defined by digital walls may include lobby, outdoor, sporting, lounge, or interactive plus spaces; and wherein particular or enhanced activity selections are available to an attendee in each of the digital spaces defined by digital walls.

5. The method of claim 1, wherein the virtual reality event host delivery dais may further include digital recreational areas selected from the group consisting of a bar, a restaurant, an outside deck, a sports area, and combinations thereof.

6. The method of claim 1, wherein the application host delivery dais interface is a website.

7. The method of claim 1, wherein a virtual venue data file includes an application engine that links an attendee with a live video service that provides a website address to access live feed.

8. The method of claim 1, wherein the attendee configuration profile includes authentication of vendors, exhibitors or presenters to vendor-specific setup controls.

9. The method of claim 1, wherein the attendee configuration profile includes customized exhibitor or presenter access to set up and stock virtual booths or virtual exhibition areas.

10. The method of claim 1, further comprising accessing an application engine capable of linking an attendee with a live video service that provides a website address to access live feed including audio and video content.

11. The method of claim 1, wherein the attendee configuration profile includes visual data corresponding to the display of a humanoid, the humanoid display having gestures, movement, gender, skin color, outfit selection, logos or combinations thereof.

12. The method of claim 1, wherein the interaction includes a programming interface to establish text chat, voice chat, or email between the attendee avatar and another attendee avatar or the host.

13. The method of claim 1, wherein the interaction includes displaying art assets, displaying media, enforcing digital walls, enabling voice control or entering chat rooms.

14. The method of claim 1, wherein the interaction includes virtually meeting up with other attendees, speaking to other attendees, capturing vendor materials or attending talks, seminars or sessions in different rooms in real time.

15. The method of claim 1, wherein selectable assets include art assets to customize avatars and spaces, video assets, room assets, footprint assets containing architect files directing location information for objects and art assets, media assets, digital walls and voice control assets; and wherein assets or settings are changed or updated on the asset server in real time by accessing and making changes from a website without interruption to an active event.

16. A system for performing the method of claim 1, comprising:
  (a.) a processor; and
  (b.) a memory configured to store instructions thereon, wherein the processor is in communication with the memory, and the processor is configured to execute the instructions for:
    i. accessing an application host delivery dais interface from a host device to create a venue configuration profile and an attendee configuration profile;
    ii. generating a virtual venue data profile from the venue configuration profile and the attendee configuration profile, the virtual venue data profile is available upon a virtual reality event host delivery dais, the virtual reality event host delivery dais comprising a plurality of digital rooms navigable by one or more attendee avatars;
    iii. generating an avatar from a virtual venue data file assigned by a host;
    iv. displaying the attendee avatar in the virtual reality event host delivery dais;
    v. directing the attendee avatar to move within the at least one of the plurality of digital spaces defined by digital walls or digital rooms of the virtual reality event host delivery dais;
    vi. detecting proximity of the attendee avatar to objects or other attendee avatars;
    vii. initiating an interaction in response to the proximity of the attendee avatar to objects or other attendee avatars; and
  (c.) an application engine capable of linking an attendee with a live video service that provides a website address to access live feed including audio and video content; the application engine is further capable of spatial awareness and 3D surround sound, such that only those avatars nearby can listen to conversation.

* * * * *